W. A. T. MÜLLER.
ELECTRICALLY DRIVEN RAILLESS TRAIN.
APPLICATION FILED NOV. 4, 1908.
1,075,595.
Patented Oct. 14, 1913.
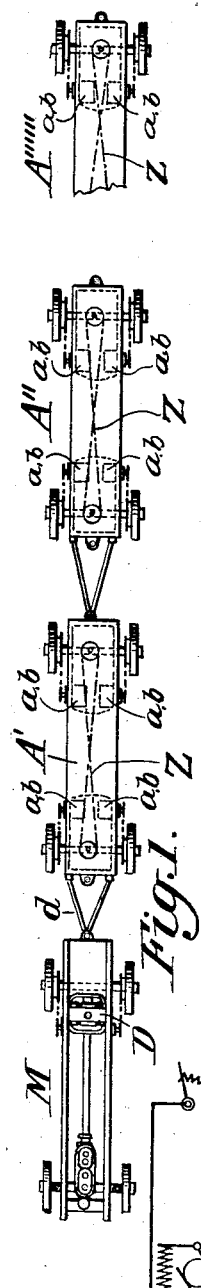
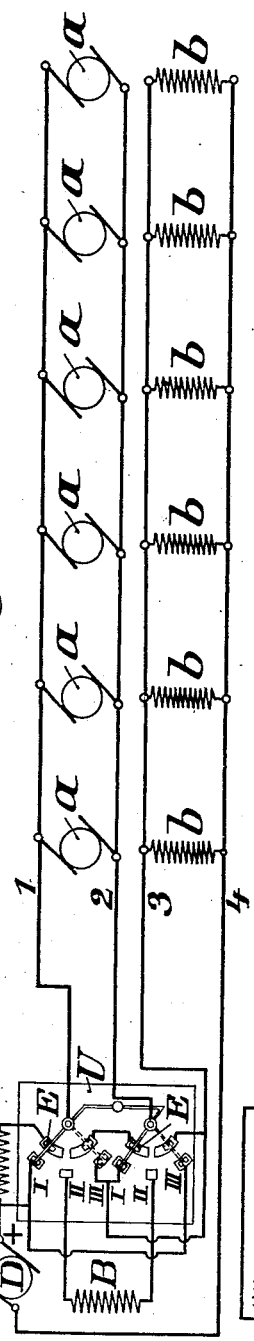
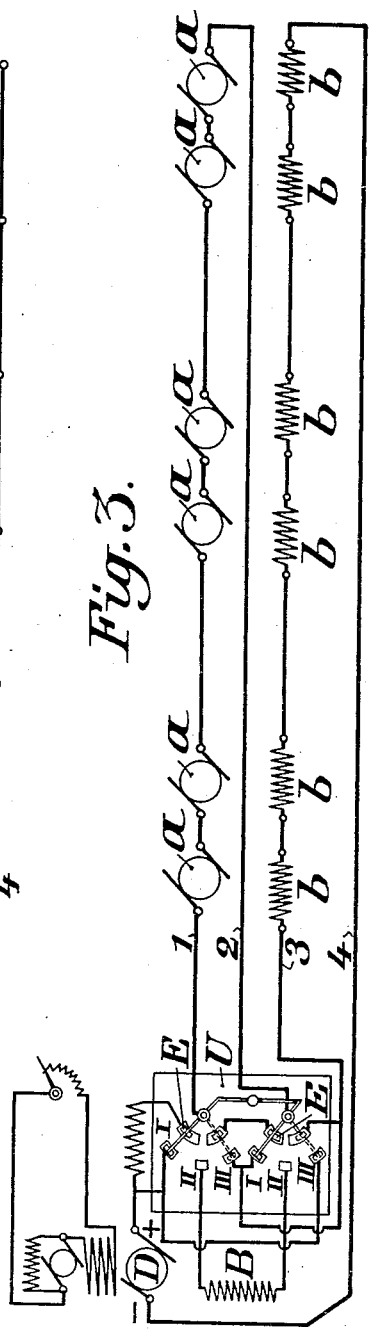
WITNESSES
INVENTOR
ATTORNEYS

UNITED STATES PATENT OFFICE.

WILHELM ADOLF THEODOR MÜLLER, OF BERLIN-STEGLITZ, GERMANY.

ELECTRICALLY-DRIVEN RAILLESS TRAIN.

1,075,595.  Specification of Letters Patent.  Patented Oct. 14, 1913.

Application filed November 4, 1908. Serial No. 461,078.

*To all whom it may concern:*

Be it known that I, WILHELM ADOLF THEODOR MÜLLER, engineer, a subject of the German Emperor, residing at 5 Feldstrasse, Berlin-Steglitz, Germany, have invented certain new and useful Improvements in and Applicable to Electrically-Driven Railless Trains; and I do hereby declare the following to be a full, clear, and exact description of the invention, such as will enable others skilled in the art to which it appertains to make and use the same.

This invention relates to improvements in the subject-matter of the copending application of Fritz Wagner, filed March 9, 1908, Serial Number 420,122, hereinafter referred to as the prior application.

The improvements relate particularly to the arrangement of the motor circuits, the reversal and the braking of the motors, and certain other details, as will hereinafter appear.

In the accompanying drawing, Figure 1 is a plan view of a trackless train embodying the invention, Fig. 2 is a diagram of the circuits of said train, Fig. 3 is a diagram of a modified arrangement.

Referring to the drawing and particularly to Fig. 1, the train as a whole is made up of a motor vehicle M, preferably located in front, and a plurality of attached vehicles or wagons A' A'' A'''''. The motor vehicle M constitutes a traveling power station and it is equipped with a dynamo D driven by means of an internal combustion motor or the like $m$. The several vehicles are coupled together by means of draw bars $d$. The individual wheels of the driving axles of the attached vehicles are preferably driven by means of separate motors $a$, $b$, so that each wheel has its own motor.

Referring now to Fig. 2, which illustrates the electrical apparatus of the above mentioned train, D is the dynamo for generating the current; it may be self-excited, or, as shown, excited by a separate dynamo. $a$ are the armatures and $b$ are the field windings of the electric motors of the vehicle.

U is a bi-polar commutator, for forward travel in position I, braking in position II and backward travel in position III. In position I the current passes from the positive (+) pole of the dynamo into the lead, 1, branches off into the armatures of the electric motors, and unites again in the lead, 2. It then passes through the commutator into the lead, 3, branches off into the field windings and passes through the lead 4, to the negative (−) pole of the dynamo. In the position III the connections differ only by the fact that the current passes through the armatures, $a$, in the direction from 2 to 1. In this circuit the intensities of the exciting currents of all the electric motors are equal, because there is no difficulty whatever in providing the field windings with equal resistance, so that:—

$$\text{The intensity of the exciting current} = \frac{\text{The sum of all the armature currents}}{\text{Number of electric motors}}$$

Since the resistance of each armature and even the magnetic conditions of the motors may be made approximately equal, the intensity of the current in each armature is finally determined by the value of the counter-electro-motive force which is produced in them during the travel. But as on the other hand the excitations of all the electric motors are also equal the value of the counter-electro-motive force will depend only on the number of revolutions.

In the position II of the commutator U, the electric motors are placed in circuit for braking. The leads 1 and 2 of the armatures are connected through the contact levers of the commutator with a braking resistance B, and the current of the dynamo is led directly into the field windings through the contacts E that are mounted in an insulated manner on said contact levers in order that the armature circuit may be entirely cut off from the current source. In the position in question, the current from the positive pole of the dynamo flows through contacts bridged by the insulated contacts E and thence directly to the lead 3 of the motor field circuit, the connection between the lead 4 and the negative pole of the dynamo remaining uninterrupted.

The circuit shown in Fig. 4 is the same as that shown in Fig. 1, except for the fact that in the arrangement of Fig. 4 the armature windings of the motors are in series with each other and the field windings are also in series with each other. The groups of armature windings and field windings respectively are adapted to be connected in series, as before. If desired, the motors of each axle can be arranged in series, and the groups so formed may be connected in parallel.

The idea of feeding the armature windings and field windings by means of separate leads in such a manner that they can be set to give forward travel, backward travel, or braking, is common to the arrangements represented in Figs. 2 and 3. If, under these circumstances the conducting circuit of the armature windings is connected in series with that of the field windings there is obtained thereby an automatic regulation of the speed of travel according to the resistance of the moving train. This is due to the fact that as the resistance to the movement (and consequently the reception of current by the armature) increases, there is also produced automatically an increase in the intensity of excitation in each of the field windings in such a manner that the speed of travel diminishes and the tractive force increases. When the resistance to the movement diminishes, the contrary action takes place.

A progressive braking action may be obtained in the circuits represented in Figs. 2 and 3, because the field windings of the electric motors are fed by the train dynamo while the armature windings can be inserted on braking resistance that is not adjustable. The braking action takes place if the dynamo D is excited. Low values for the dynamo potential are sufficient for the necessary excitation of the fields of the electric motors. In order not to interfere with the gradual regulation of the braking, a suitable resistance F may be arranged in the lead between the dynamo and the coupling contact.

It is to be noted that in position 1 of the commutator U, the resistance F is short-circuited and the current passes from the positive brush of the generator directly to the armature lead 1 without passing through said resistance. In position II, however, the current from the positive brush of the generator passes through the resistance F and through the contacts E, which bridge the contacts of the commutator, and thence directly to the lead 3 of the motor field circuit. By throwing in the resistance F, therefore, the current in the field coils $b$ is reduced.

What I claim is:—

1. In an electrically driven vehicle having a plurality of driving wheels, electric motors to drive separately the respective wheels, said motors comprising a group of armatures supplied by one pair of mains and a group of motor fields supplied by a second pair of mains, and means connecting said current source with said motors in such a manner that one pair of said mains is connected in series with the other pair.

2. In an electrically driven vehicle having a plurality of driving wheels, electric motors to drive separately the respective wheels, a source of current, and means connecting said current source with said motors in such a manner that a group of motor armatures is connected in series with a group of motor fields, the armature of each motor being connected in series with its field.

3. In an electrically driven train, a plurality of vehicles, a plurality of electric motors on said vehicles to drive separately the respective driving wheels thereof, a source of current on one of said vehicles, circuit connections with said current source connecting permanently the motor armatures in one group and the motor fields in another group, and a commutator to close said circuit connections and to connect said groups in series.

4. In an electrically driven train, a plurality of vehicles, a plurality of electric motors on said vehicles to separately drive the respective driving wheels thereof, a source of current on one of said vehicles, circuit connections with said current source permanently connecting the motor armatures in one group and the motor fields in another group, a braking resistance, and a commutator to close said connections and to connect said groups in series, said commutator being operative to disconnect the armature group from the current source and connect it with said braking resistance.

5. In an electrically driven train, a plurality of vehicles, a plurality of electric motors on each of said vehicles to separately drive the respective driving wheels thereof, a current source on one of said vehicles, circuit connections to connect said current source with the motor armatures and fields in such a manner that the armatures are permanently connected in one group and the fields in another group, and means to inter-connect said groups, with the current flowing through the motor armatures in either direction.

6. In an electrically driven train, a plurality of vehicles, a plurality of electric motors on each of said vehicles to separately drive the respective driving wheels thereof, a current source on one of said vehicles, circuit connections to connect said current source with the motor armatures and fields in such a manner that the armatures are permanently connected in one group and the fields in another group, a braking resistance, and means to inter-connect said groups, with the current flowing through the motor armatures in either direction, said means being likewise operative to disconnect the motor armatures from the current source and connect them with said braking resistance.

7. In an electrically driven train, a plurality of inter-connected vehicles, a dynamo on one of said vehicles, motors on other vehicles, separate pairs of mains for the armatures and fields respectively of the several motors, a braking resistance, and a commutator interposed between said mains and the dynamo and having one position in which the group of motor armatures and the group of motor fields are connected in series with each other, with the current flowing through the armatures in one direction, a second position in which the current through the armatures is reversed, and a third position wherein the dynamo is connected with the motor fields and the motor armatures are connected in series with said braking resistance; substantially as described.

In testimony whereof I have affixed my signature, in presence of two witnesses.

WILHELM ADOLF THEODOR MÜLLER.

Witnesses:
  HENRY HASPER,
  WOLDEMAR HAUPT.

---

Copies of this patent may be obtained for five cents each, by addressing the "Commissioner of Patents, Washington, D. C."